US005879113A

United States Patent [19]
Ueyama et al.

[11] Patent Number: 5,879,113
[45] Date of Patent: Mar. 9, 1999

[54] MACHINE TOOL

[75] Inventors: Hirochika Ueyama, Hirakata; Manabu Taniguchi, Kashihara, both of Japan

[73] Assignee: Koyo Seiko Co., Ltd., Osaka, Japan

[21] Appl. No.: 827,608

[22] Filed: Apr. 9, 1997

[51] Int. Cl.[6] ................................ B23C 1/06; B23C 9/00; B23Q 15/013
[52] U.S. Cl. .................... 409/148; 408/124; 409/154; 409/193; 409/231
[58] Field of Search ............................. 409/80, 147, 148, 409/154, 193, 231; 408/124

[56] References Cited

U.S. PATENT DOCUMENTS

| 5,193,953 | 3/1993 | Jesinger ................................ 409/231 |
| 5,739,607 | 4/1998 | Wood, III ............................. 409/231 |
| 5,772,564 | 6/1998 | Taniguchi et al. ................... 409/231 |

FOREIGN PATENT DOCUMENTS

| 3828589 | 3/1990 | Germany .............................. 409/231 |
| 202750 | 11/1983 | Japan .................................... 409/193 |
| 152304 | 7/1986 | Japan .................................... 409/231 |

*Primary Examiner*—Daniel W. Howell
*Attorney, Agent, or Firm*—Rabin & Champagne P.C.

[57] ABSTRACT

A machine tool comprises a spindle unit for raising a spindle on which a cutting tool is mounted by a magnetic force and supporting the spindle. The spindle unit carries out feedback control so as to maintain the spindle in its target position in the radial direction. A feeder for feeding the cutting tool to a work comprises a servo motor for moving the spindle unit relatively to the work. A feeding controller for controlling a feeding operation of the feeder controls the speed of rotation of the servo motor on the basis of feed speed data stored in a memory. The feed speed data comprises a first feed speed corresponding to the time when the cutting tool cuts through an end surface of the work crossing the direction of feeding and a second feed speed corresponding to the time of normal working and higher than the first feed speed.

5 Claims, 11 Drawing Sheets

MACHINE TOOL

BACKGROUND OF THE INVENTION

1. Field of the Invention

The present invention relates to a machine tool for moving a spindle on which a cutting tool is mounted relatively to a work and feeding the cutting tool to the work in a predetermined direction of feeding, to subject the work to working.

2. Description of the Prior Art

In order to shorten working time, a machine tool comprising a spindle unit of a type capable of rotating the cutting tool at a high speed and supported by a magnetic bearing has been conventionally widely employed.

The magnetic bearing supporting type spindle unit comprises i) a main body, ii) a spindle serving as a rotating shaft passed through the main body for transmitting torque to a cutting tool, iii) an electromagnet for radially supporting the spindle with a clearance therebetween by its magnetic force, iv) a position sensor for sensing the position in the radial direction of the spindle, and v) magnetic force controlling means for finding the deviation between the position in the radial direction of the spindle obtained on the basis of an output signal from the position sensor and the target position in the radial direction of the spindle with respect to the main body (the amount of the shift in the position in the radial direction from the target position of the spindle), and controlling the magnetic force of the electromagnet so as to cancel the deviation and maintain the spindle at the target position.

In order to further shorten the working time, in the machine tool comprising the magnetic bearing supporting type spindle unit, one employing a servo motor having the capacity to move the spindle unit relatively to the work and feed the cutting tool to the work at a high speed (for example, 10 to 15 m/min) in a predetermined direction of feeding at the time of working has been spreading in recent years. FIGS. 10A to 10F illustrate an example of working using a machine tool having the above-mentioned high-speed feeding function. In FIGS. 10A to 10F, a work 2 is moved, to feed a cutting tool 1 composed of an end mill to the work 2 at a predetermined high speed along a direction of feeding M, cause the cutting tool 1 to cut through the work 2 crossing the direction of feeding M from its one end surface 2a to the other end surface 2b, and process a surface to be cut 2c of the work 2. L denotes a working line to be traced by the cutting tool 1, and F denotes an external force received by the cutting tool 1.

The cutting tool 1 is subjected to a change in the external force F rapidly increased from zero when it cuts into the one end surface 2a as shown in FIGS. 10A and 10B, while being subjected to a change in the external force F rapidly reduced to zero when it cuts through the other end surface 2b as shown in FIGS. 10E and 10F. The larger the feed speed is, the higher the rate of change in the external force F is.

When an attempt to increase the feed speed to perform working at a high speed is made, therefore, the position of the cutting tool 1 is rapidly shifted in the direction in which the amount of cutting into the surface to be cut 2c is decreased (downward in the drawings) with respect to the main body of the spindle unit in the initial stages of working (see FIGS. 10A and 10B), while being rapidly shifted in the direction in which the amount of cutting is increased (upward in the drawings) in the final stages of working (see FIGS. 10D, 10E and 10F). In the intermediate stages of working shown in FIG. 10C, the external force F becomes approximately constant, so that the cutting tool 1 is almost moved on the working line.

On the other hand, in the spindle unit, a magnetic force exerted to reduce the shift in the position to zero is produced. However, the production of the magnetic force cannot follow the above-mentioned rapid shift in the position without the delay. Therefore, in the initial stages and the final stages of working, the amount of the shift in the position from the working line L exceeds an allowable range Q as shown in FIG. 11. Therefore, insufficient cutting 2d exceeding the allowable level occurs in the initial stages of working, and excessive cutting 2e exceeding the allowable level occurs in the final stages of working, as shown in FIG. 10F.

SUMMARY OF THE INVENTION

An object of the present invention is to provide a machine tool capable of working a work without insufficiently cutting the work when it cuts through an end surface of the work to start and terminate cutting and at a high speed.

In order to attain the above-mentioned object, in a preferred mode, the present invention comprises a cylindrical main body, a spindle passed through the main body for transmitting torque to a cutting tool, an electromagnet for radially supporting the spindle with a clearance therebetween by its magnetic force, position detecting means for detecting the position in the radial direction of the spindle, and a spindle unit comprising means for controlling the magnetic force of the electromagnet so as to maintain the spindle at its target position on the basis of a signal from the position detecting means.

The present invention further comprises feeding means comprising a servo motor for moving the spindle unit relatively to a work and feeding the cutting tool to the work in a predetermined direction of feeding, and feeding controlling means for controlling the speed of rotation of the servo motor on the basis of feed speed data stored in a memory. The feed speed data comprises a first feed speed corresponding to the time when the cutting tool cuts through an end surface of the work crossing the direction of feeding and a second feed speed corresponding to the time of normal working and higher than the first feed speed.

The feed speed at the time of cutting the work has been conventionally made constant. On the other hand, in this mode, the first feed speed at the time when the cutting tool cuts through the end surface of the work is made lower than the second feed speed at the time of normal working at the beginning and the end of the cutting of the work. When the cutting tool cuts through the end surface of the work, therefore, the rate of change of an external force exerted on the cutting tool can be reduced. As a result, the rate of change of the amount of the shift in the position of the cutting tool can be reduced.

When the rate of change of the amount of the shift in the position is thus low, a magnetic force corresponding to the change in the amount of the shift in the position can be produced without significant delay, whereby the amount of the shift in the position can be restrained in an allowable range. As a result, it is possible to cause insufficient cutting and excessive cutting. Further, the second feed speed may be made sufficiently high. Therefore, the working speed can be kept high as a whole.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

A preferred embodiment of the present invention will be described in detail on the basis of the drawings.

Figure 1:
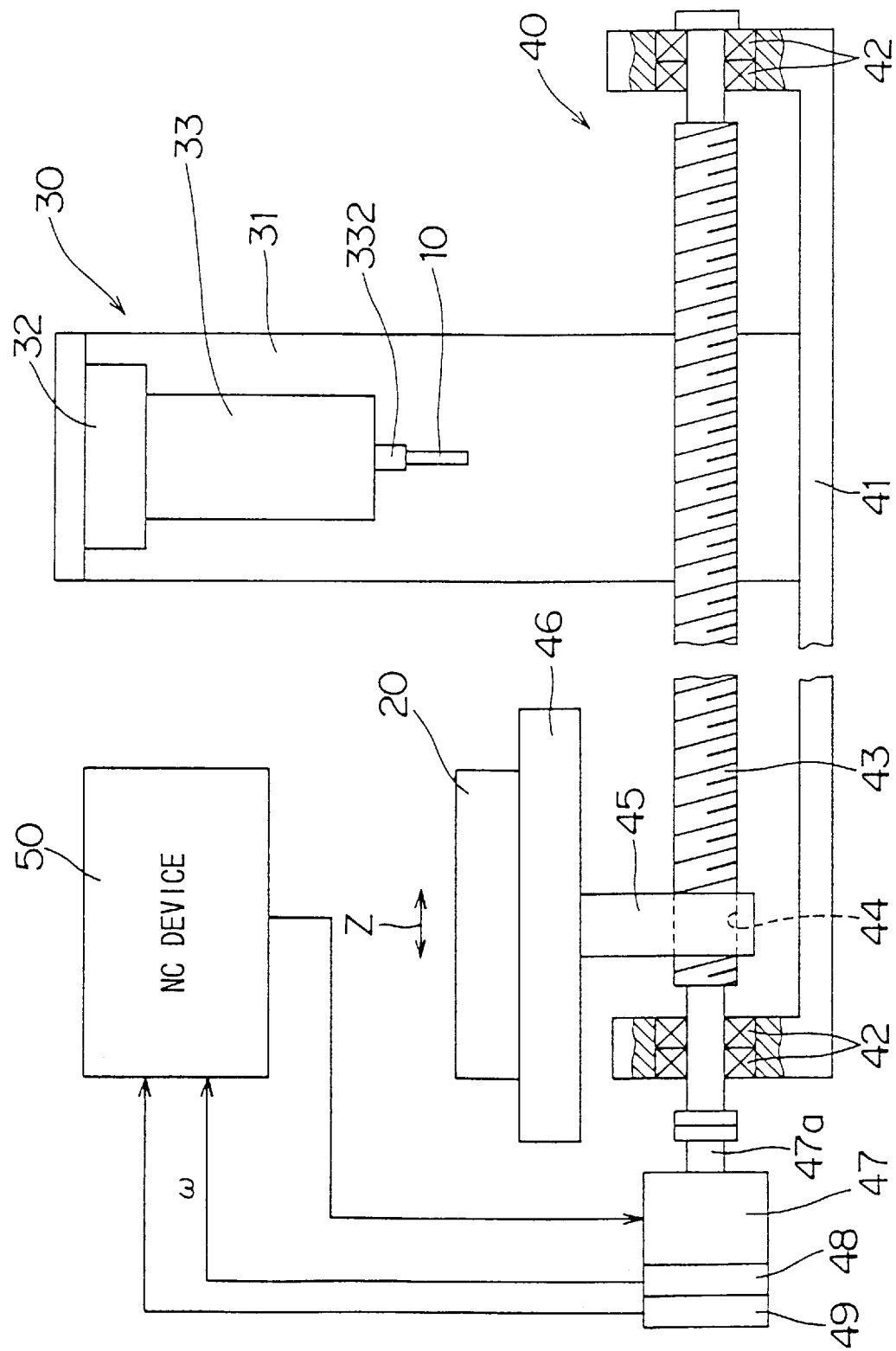
FIG. 1 is a schematic view showing the entire construction of a machine tool according to one embodiment of the present invention.

Referring to FIG. 1, a machine tool according to the present embodiment is for subjecting a work 20 to working by changing the relative positional relationship between a cutting tool 10 such as an end mill and the work 20, and comprises (1) a cutter 30 including the cutting tool 10, (2) a feeder 40 serving as feeding means for feeding the work 20 toward the cutting tool 10, (3) a numerical controller 50 (hereinafter referred to as an NC device 50) serving as feeding controlling means for controlling a feeding operation of the feeder 40 on the basis of working command data changed into a numerical value.

The cutter 30 comprises (1) a base stand 31 vertically provided along a direction perpendicular to the direction of the Z axis, (2) a table 32 fixed to the upper part of the base stand 31, and (3) a magnetic bearing type spindle unit 33 so mounted on the table 32 that the cutting tool 10 faces the work 20 from above. The cutting tool 10 is rotated at a high speed by the spindle unit 33.

The feeder 40 comprises a base stand 41 horizontally provided along the direction of the Z axis, (2) a feed screw 43 supported on the base stand 41 through a bearing 42, (3) a nut 44 screwed into the feed screw 43, (4) a table 46 which is connected to the nut 44 through a connecting member 45 and on which the work 20 is mounted, (5) a servo motor 47 to which an output shaft 47a is connected through the feed screw 43 and a joint, (6) a rotational speed sensor 48 for sensing the rotational speed ω of the servo motor 47, and (7) a rotation angle sensor 49 for sensing the rotation angle θ of the servo motor 47. The feeder 40 rotates the feed screw 43 forward and backward by the servo motor 47, to cause the table 46 to advance and retreat along the direction of the Z axis.

The servo motor 47 has the capacity to feed the table 46 at a high speed (for example, 10 to 15 m/min) at the time of working.

The rotational speed sensor 48 and the rotation angle sensor 49 are directly mounted, respectively, on the servo motor 47, so that the output signals ω and θ of the detectors 48 and 49 are fed to the NC device 50.

Figure 2:
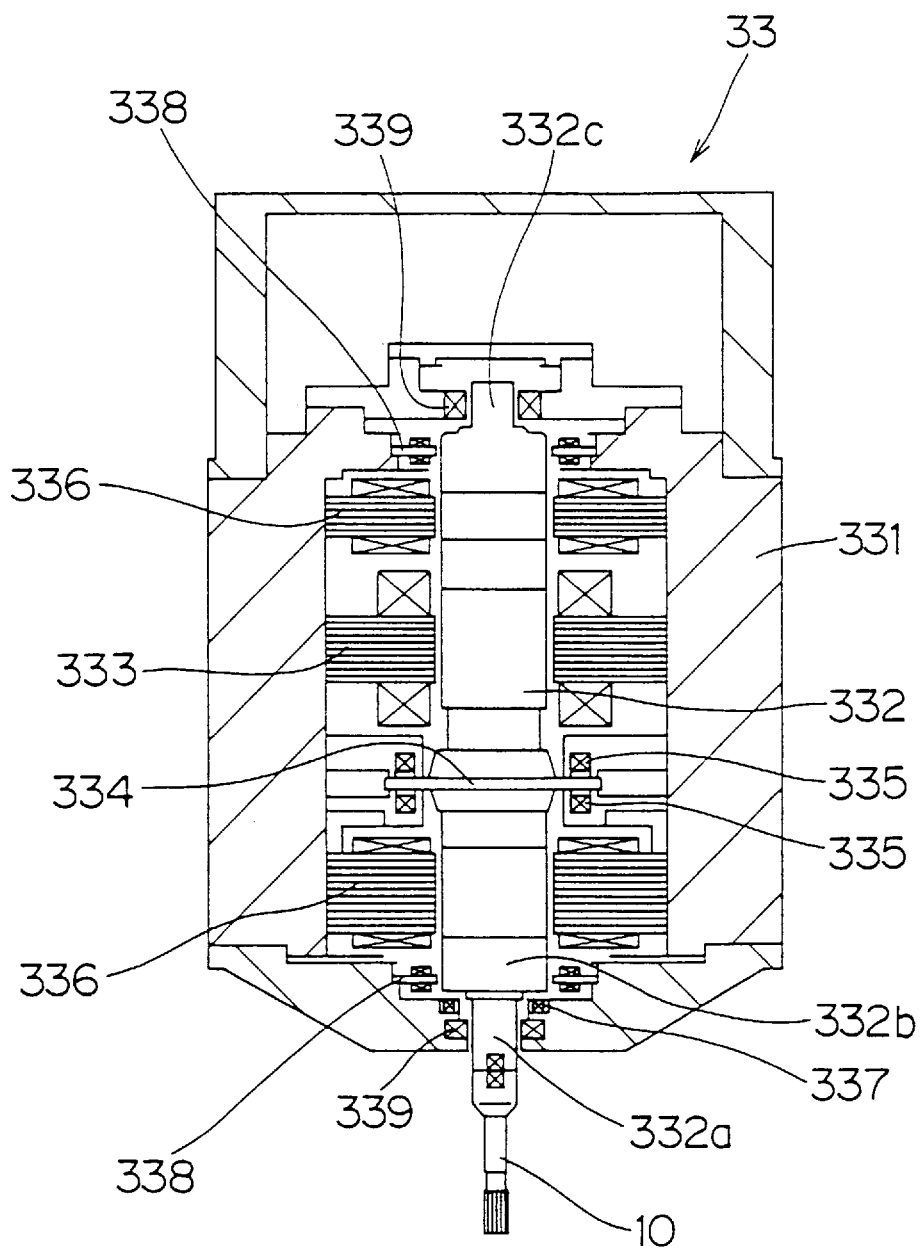
FIG. 2 is a longitudinal sectional view showing the construction of a magnetic bearing spindle.

Referring to FIG. 2, the spindle unit 33 comprises a rotating shaft 332, a high-frequency motor 333, an axial electromagnet 335, radial electromagnets 336, an axial direction position sensor 337, and a radial direction position sensor 338 in a cylindrical main body 331 constituting its outer shape.

The rotating shaft 332 has its front end 332a projected downward from the main body 331, to transmit torque to the cutting tool 10 mounted on the front end 332a. The high-frequency motor 333 is arranged in an approximately central part in the axial direction of the rotating shaft 332, to rotate the rotating shaft 332 at a high speed.

The axial electromagnet 335 is arranged adjacent to the high-frequency motor 333 for axially supporting the rotating shaft 332 with a clearance therebetween by its magnetic force through a rotating disc 334 fixed to the rotating shaft 332. The pair of radial electromagnets 336 is arranged on both sides with the high-frequency motor 333 and the rotating disc 334 interposed therebetween, for radially supporting the rotating shaft 332 with a clearance therebetween by its magnetic force.

The axial direction position sensor 337 is arranged in the vicinity of a step 332b connecting with the front end 332a of the rotating shaft 332, for sensing the position in the axial direction of the rotating shaft 332. The radial direction position sensor 338 is arranged in the vicinity of the radial electromagnet 336, for sensing the position in the radial direction of the rotating shaft 332.

In FIG. 2, reference numeral 339 denotes a touchdown bearing, which is for touching the rotating shaft 332 down when the respective magnetic forces of both the electromagnets 335 and 336 are lost as the energization to both the electromagnets 335 and 336 is disconnected.

The high-frequency motor 333, both the electromagnets 335 and 336, both the position sensors 337 and 338, and the touchdown bearing 339 are respectively fixed to the main body 331.

Figure 3:
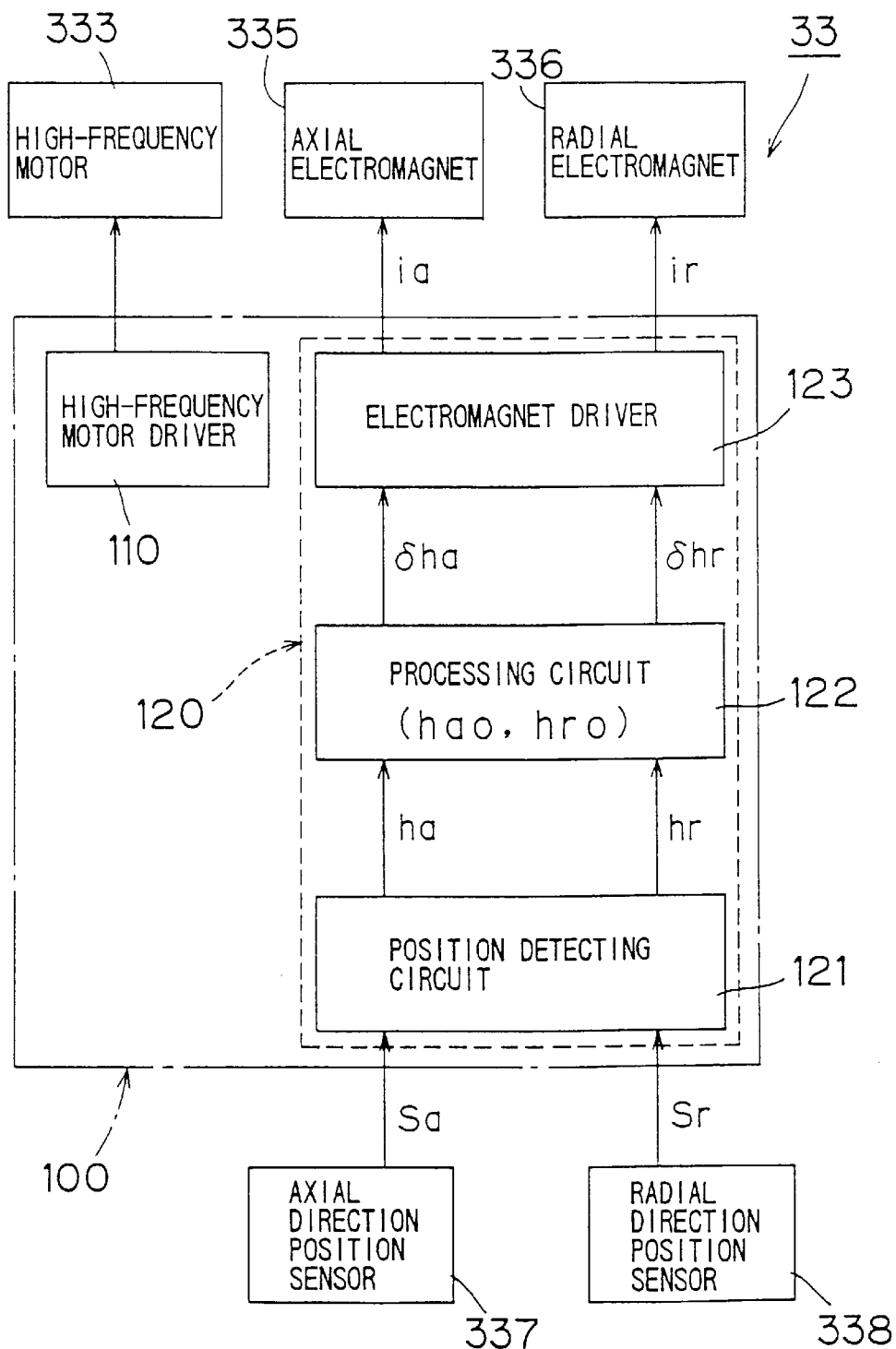
FIG. 3 is a block diagram showing the electrical construction of the magnetic bearing spindle.

Respective output signals of the axial direction position sensor 337 and the radial direction position sensor 338 are fed to a controller 100 shown in FIG. 3.

FIG. 3 is a block diagram showing the electrical construction of the spindle unit. Referring to FIG. 3, a spindle unit 33 further comprises a controller 100 for driving the high-frequency motor 333 as well as controlling the respective magnetic forces of the axial electromagnet 335 and the radial electromagnet 336.

The controller 100 comprises (1) a high-frequency motor driver 110 for driving the high-frequency motor 333, and (2) a magnetic force control section 120 serving as magnetic force controlling means for controlling the magnetic force of the axial electromagnet 335 in order to maintain the rotating shaft 332 at a target position in the axial direction $h_{a0}$ with respect to the main body 331 upon input of an output signal $S_a$ of the axial direction position sensor 337 as well as controlling the magnetic force of the radial electromagnet 336 in order to maintain the rotating shaft 332 at a target position in the radial direction $h_{r0}$ with respect to the main body 331 upon input of an output signal $S_r$ of the radial direction position sensor 338.

The magnetic force control section 120 comprises a position detecting circuit 121, a processing circuit 122, and an electromagnet driver 123. The position detecting circuit 21 finds a position in the axial direction $h_a$ of the rotating shaft 332 on the basis of the output signal $S_a$ from the axial direction position sensor 337, and feeds the position to the processing circuit 122.

The processing circuit 122 stores the target position in the axial direction $h_{a0}$ of the rotating shaft 332, finds axial deviation (the amount of the shift in the position in the axial direction from the target position in the axial direction $h_{a0}$ of the rotating shaft 332) $\delta h_a$ by comparing the target position in the axial direction $h_{a0}$ and the position in the axial direction $h_a$, amplifies the axial deviation $\delta h_a$, and feeds the deviation to the electromagnet driver 123.

The electromagnet driver 123 feeds an excitation current $i_a$ canceling the axial deviation $\delta h_a$ to the axial electromagnet 335. The axial electromagnet 335 is thus excited. As a result, the rotating shaft 332 is maintained at the target position in the axial direction $h_{a0}$. Further, the position detecting circuit 121 finds a position in the radial direction $h_r$ of the rotating shaft 332 on the basis of the output signal $S_r$ from the radial direction position sensor 338, and feeds the position to the processing circuit 122.

Figure 4:
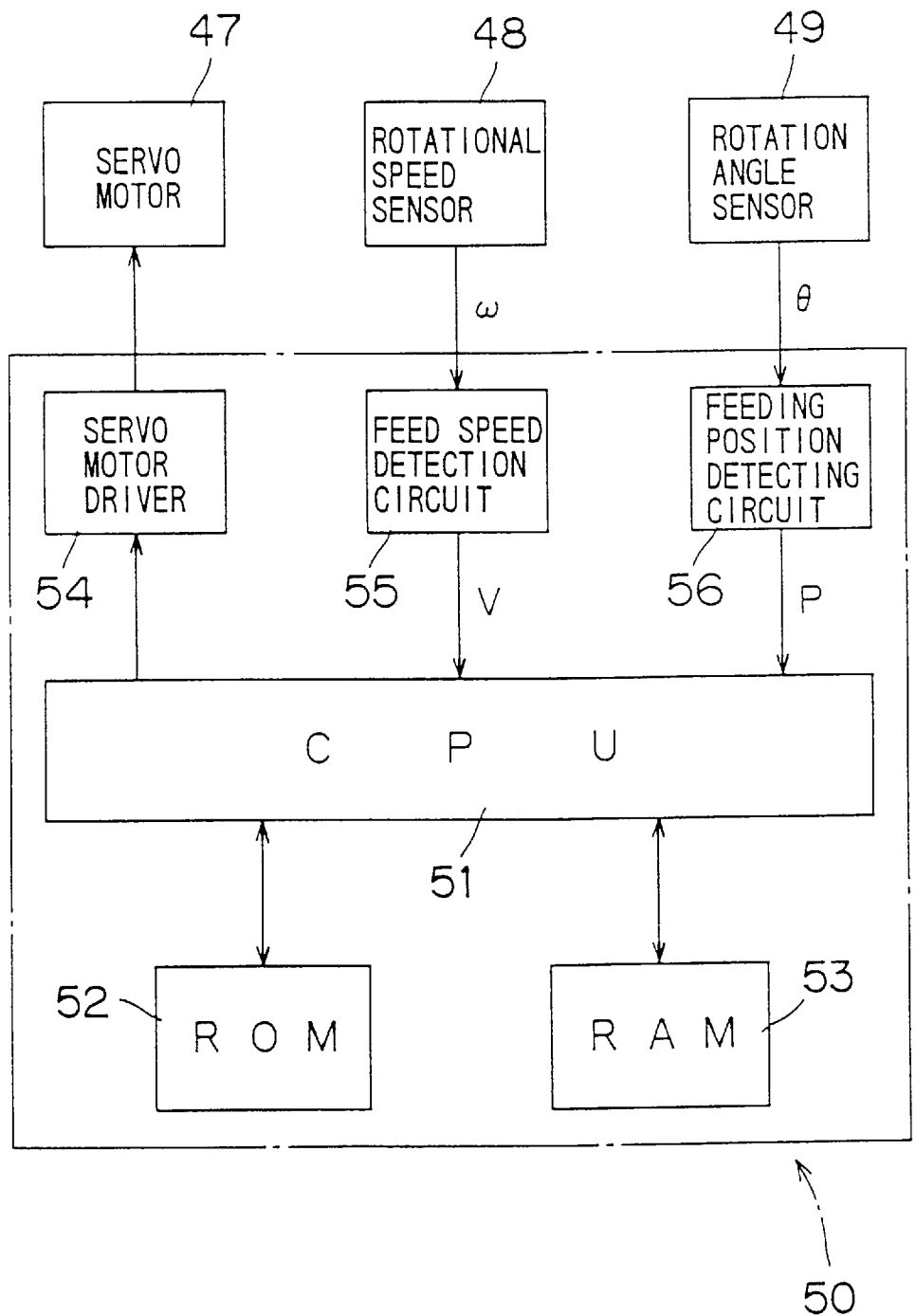
FIG. 4 is a block diagram showing the electrical construction of an NC device.

The processing circuit 122 stores the target position in the radial direction $h_{r0}$ of the rotating shaft 332 with respect to the main body 331, finds radial deviation (the amount of the shift in the position in the radial direction from the target position in the radial direction $h_{r0}$ of the rotating shaft 332) $\delta h_r$ by comparing the target position in the radial direction $h_{r0}$ and the position in the radial direction $h_r$, amplifies the radial deviation $\delta h_r$, and feeds the deviation to the electromagnet driver 123. The electromagnet driver 123 feeds an excitation current $i_r$ canceling the radial deviation $\delta h_r$ to the radial electromagnet 336. The radial electromagnet 336 is thus excited. As a result, the rotating shaft 332 is maintained at the target position in the radial direction $h_{r0}$ FIG. 4 is a block diagram showing the electrical construction of the NC device. Referring to FIG. 4, the NC device 50 comprises (1) a CPU 51 carrying out the center of calculation processing, (2) a ROM 52 storing a control operation program of the CPU 51, (3) a RAM 53 to which data is temporarily written and from which the written data is read out when the CPU 51 performs a control operation, (4) a servo motor driver 54 for controlling the driving of the servo motor 47, (5) a feed speed detecting circuit 55 for finding a feed speed V of the table on the basis of the output signal $\omega$ from the rotational speed sensor 48, and (6) a feeding position detecting circuit 56 for finding a feeding position P of the table on the basis of the output signal $\theta$ from the rotation angle sensor 49.

The feed speed V found in the feed speed detecting circuit 55 and the feeding position P found in the feeding position detecting circuit 56 are respectively fed to the CPU 51, and the CPU 51 controls the speed of rotation of the servo motor 47 through the servo motor driver 54 on the basis of the feed speed V and the feeding position P.

Description is now made of a feeding operation of the above-mentioned machine tool. The manner of working is such that the work 20 is moved, to feed the cutting tool 10 composed of an end mill to the work 20 along a direction of feeding M, as shown in FIG. 5, cause the cutting tool 10 to cut through the work 20 perpendicular to the direction of feeding M from the one end surface 20a to the other end surface 20b, and process the surface to be cut 20c of the work 20 (that is, one side working).

Figure 5:
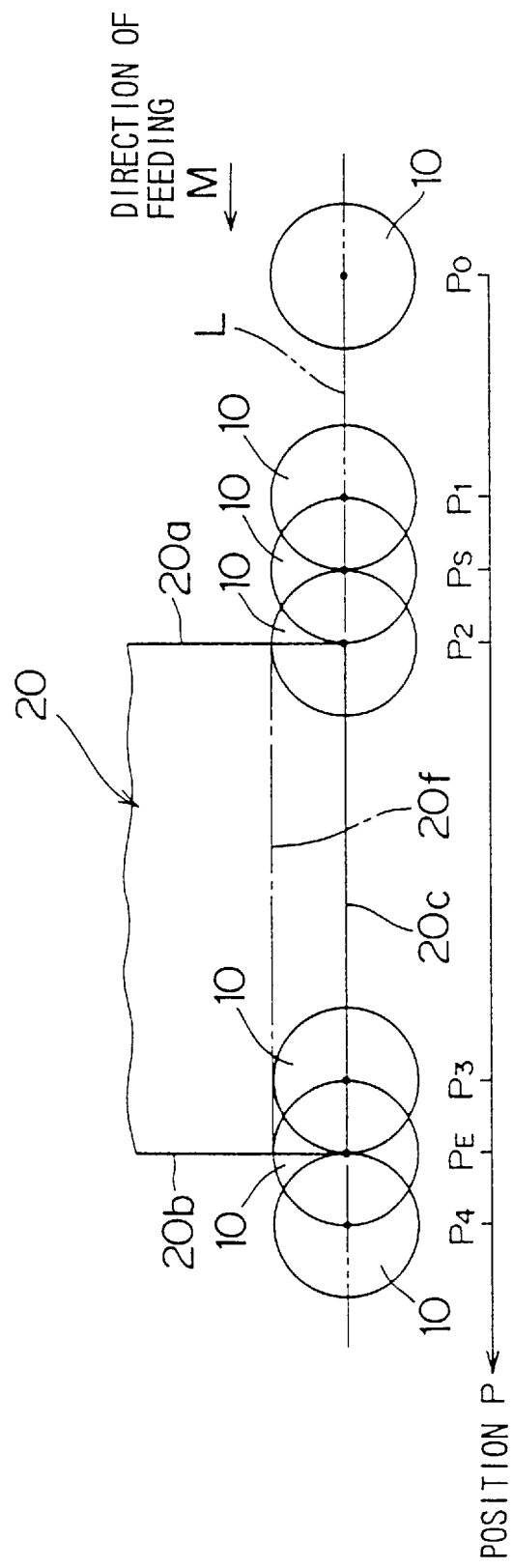
FIG. 5 is a diagram schematically showing the relative positional relationship of a work and a cutting tool fed to the work.

A scale shown in the lower part of FIG. 5 indicates the feeding position of the cutting tool 10, where $P_0$ indicates the home position of the cutting tool 10, $P_S$ indicates the position where working is started, and $P_E$ indicates the position where working is terminated.

Figure 6:
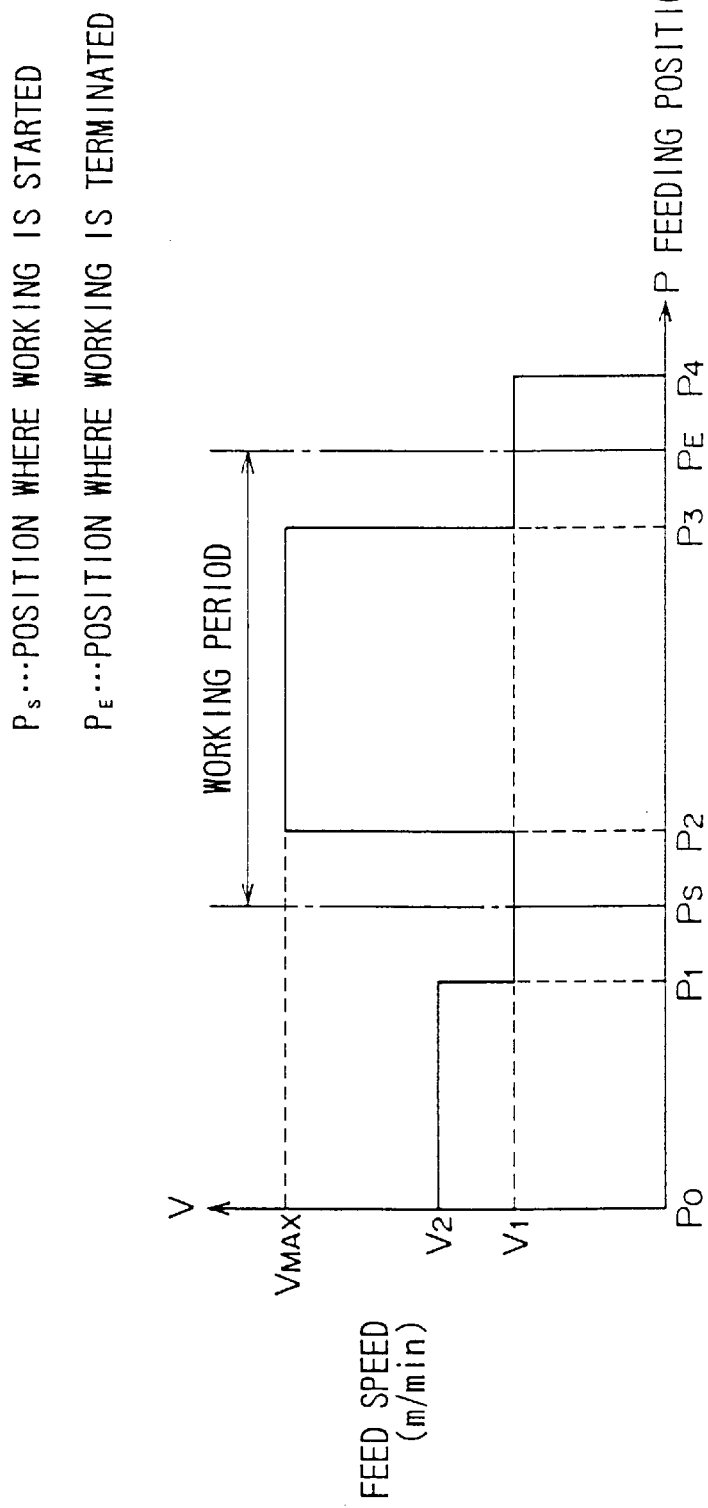
FIG. 6 is a diagram showing a previously set relationship between the feeding position of a cutting tool and the target feed speed.

FIG. 6 graphically shows working command data obtained by representing a target relationship between the feeding position P and the feed speed V by a numerical value. A feeding control operation of the feeder 40 is performed by the NC device 50 on the basis of the above-mentioned data. The feed speed V is set to a feed speed $V_2$ in a section from the home position $P_0$ where the cutting tool 10 is stopped to a feeding position $P_1$ at a predetermined distance away from the position where working is started $P_S$ along the reverse direction of feeding.

Furthermore, the feed speed V is set to a predetermined low feed speed $V_1$ in a section from the feeding position $P_1$ to a feeding position $P_2$ including the position where working is started Ps and a section from a feeding position $P_3$ to a feeding position $P_4$ including the position where working is terminated $P_E$. The feed speed $V_1$ is so set that the above-mentioned radial deviation (the amount of the shift in the position in the radial direction from the target position in the radial direction $h_{r0}$ of the rotating shaft 332) $\delta h_r$ falls within a predetermined allowable range Q in the initial stages and the final stages of working on the basis of test working previously carried out. With respect to the setting of the feed speed $V_1$, a feed speed which is as high as possible is selected out of ones satisfying the above-mentioned conditions (the amount of the shift in the position which is the radial deviation is within the allowable range Q) is selected, thereby to shorten the working time as a whole.

Furthermore, the feed speed V is set to the highest feed speed $V_{MAX}$ in a section from the feeding position $P_2$ to the feeding position $P_3$ which corresponds to the intermediate stages of working.

When the NC device 50 is urged to start the feeding, the CPU 51 first reads out a target value of feed speed data relating to a feeding position which is stored in the ROM 52, and writes the data into the RAM 53. On the other hand, the feeding position P obtained by the feeding position detecting circuit 56 on the basis of the output signal $\theta$ from the rotational speed sensor 49 is fed to the CPU 51, and the feed speed V obtained by the feed speed detecting circuit 55 on the basis of the output signal $\omega$ from the rotational speed sensor 48 is fed to the CPU 51. In the CPU 51, the feed speed detected in the detected feeding position and the target feed speed are compared with each other, and the speed of rotation of the servo motor 47 is controlled through the servo motor driver 54 so that the target feed speed is attained. Consequently, the table 46 on which the work 20 is mounted is caused to advance in the direction of the Z axis toward the cutting tool 10.

Figure 7:
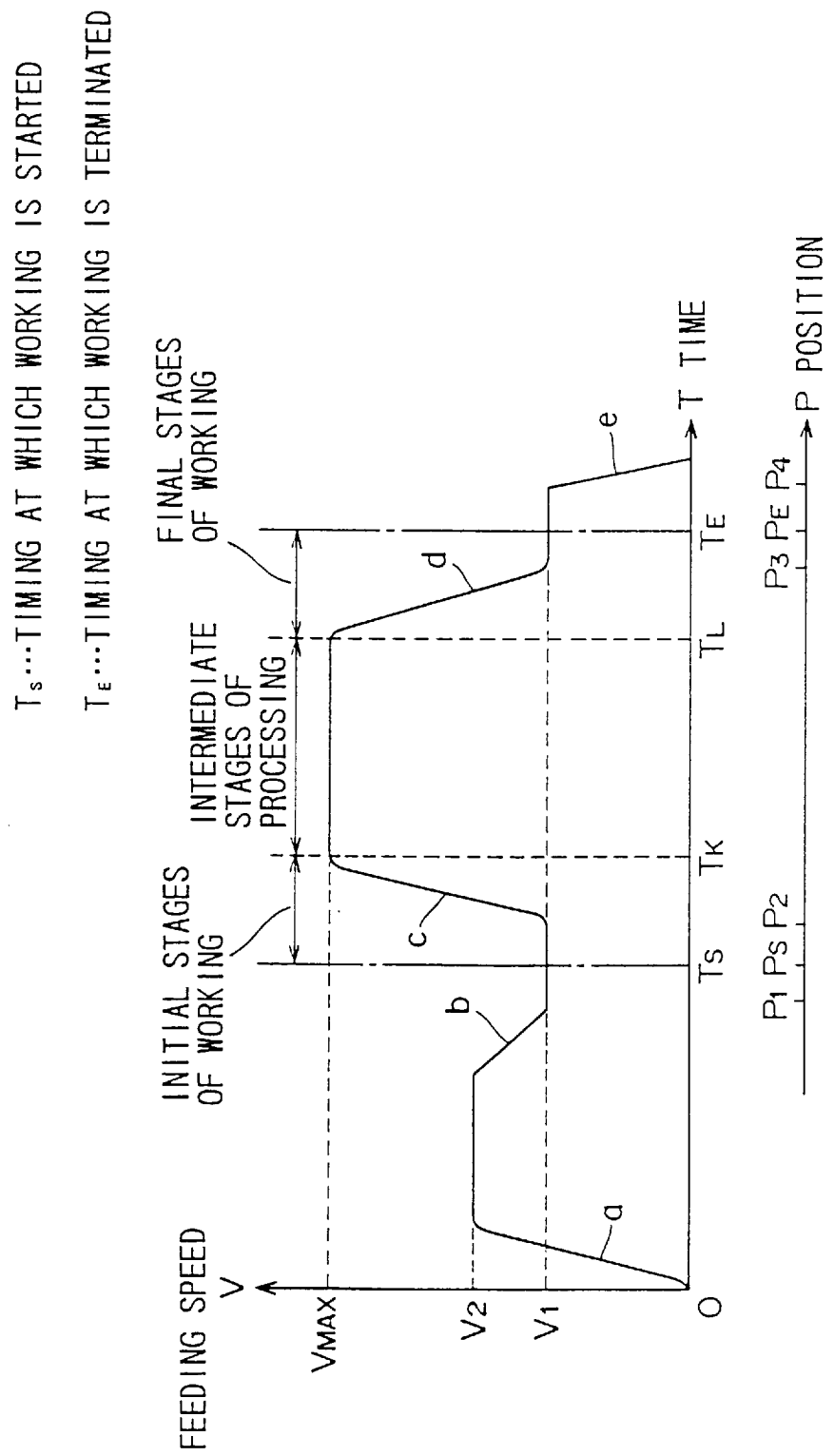
FIG. 7 is a diagram showing the change with time of the actual feed speed.

Although the feeding control of the feeder 40 is carried out in accordance with the working command data shown in FIG. 6, the actual feed speed is changed with time as shown in FIG. 7. Specifically, in the feeding positions $P_0$, $P_1$, $P_2$, $P_3$ and $P_4$ in which the target feed speed is gradually changed in FIG. 6, the actual feed speed is transiently changed with certain delay (in portions respectively indicated by a, b, c, d and e in FIG. 7). In FIG. 7, $T_S$ indicates the timing at which working is started, and is the timing at which the cutting tool 10 passes through the feeding position $P_S$ in FIGS. 5 and 6. $T_E$ indicates the timing at which working is terminated, and is the timing at which the cutting tool 10 passes through the feeding position $P_E$ in FIGS. 5 and 6.

In FIG. 7, a period from the timing $T_S$ at which working is started to the timing $T_K$ at which the feed speed enters a stationary state of $V_{MAX}$ shall be referred to as initial stages of working, a period during which the feed speed is in the stationary state (a period from the timing $T_K$ to the timing $T_L$) shall be referred to as intermediate stages of working, and a period from the timing at which the stationary state is terminated to the timing TE at which working is terminated shall be referred to as final stages of working.

Figure 8:
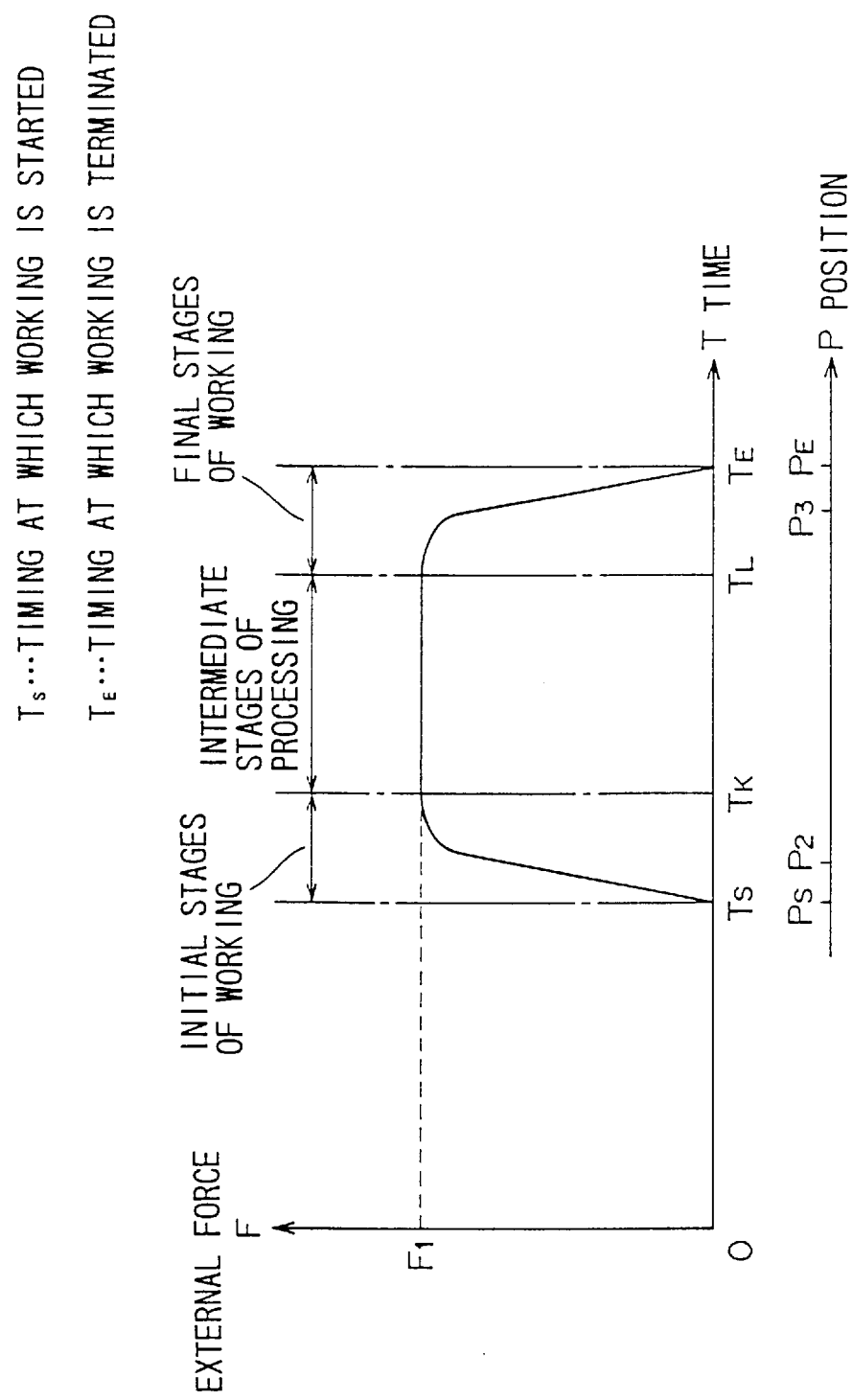
FIG. 8 is a diagram showing the change with time of an external force for radially displacing the cutting tool.

During the above-mentioned working, the external force F for radially displacing the rotating shaft 332 of the spindle unit 33 is then changed as shown in FIG. 8. That is, the external force F is relatively gently increased from zero to $F_1$ in the initial stages of working, is gently decreased from $F_1$ to zero in the final stages of working, and is constant at $F_1$ in the intermediate stages of working. In FIGS. 7 and 8, the scale of the feeding position P is indicated parallel to the time base.

Figure 9:
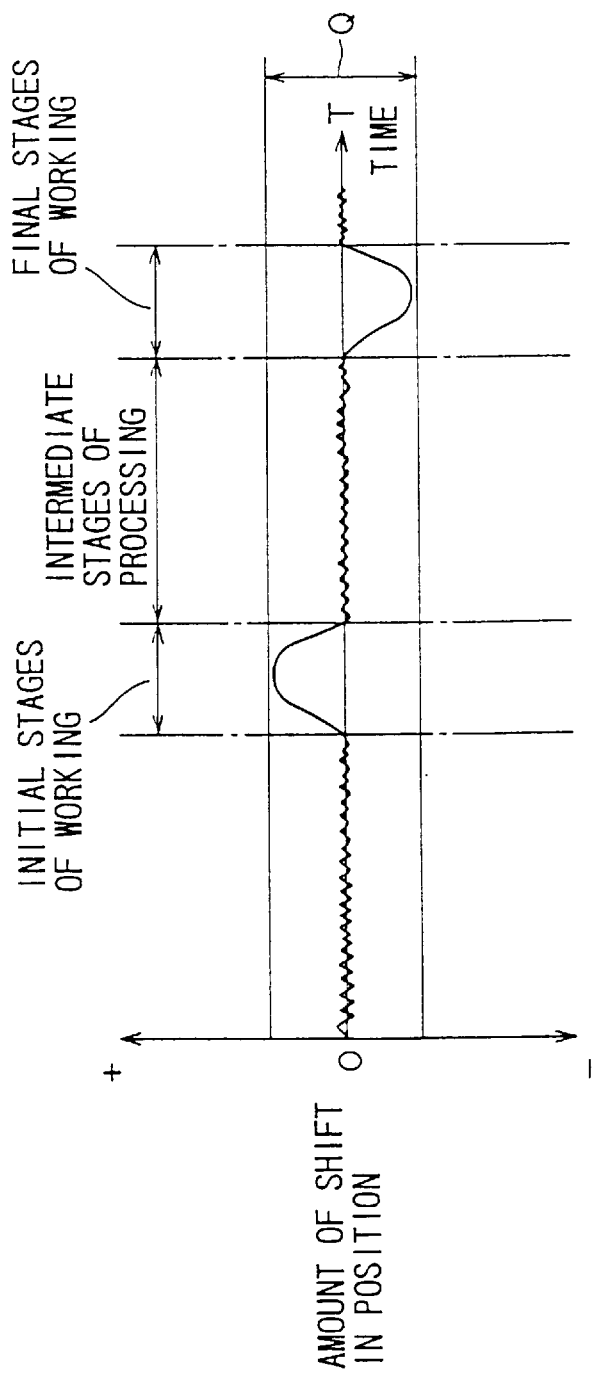
FIG. 9 is a diagram showing the change with time of the amount of the shift in the position from the target position of a rotating shaft.
Figure 10:
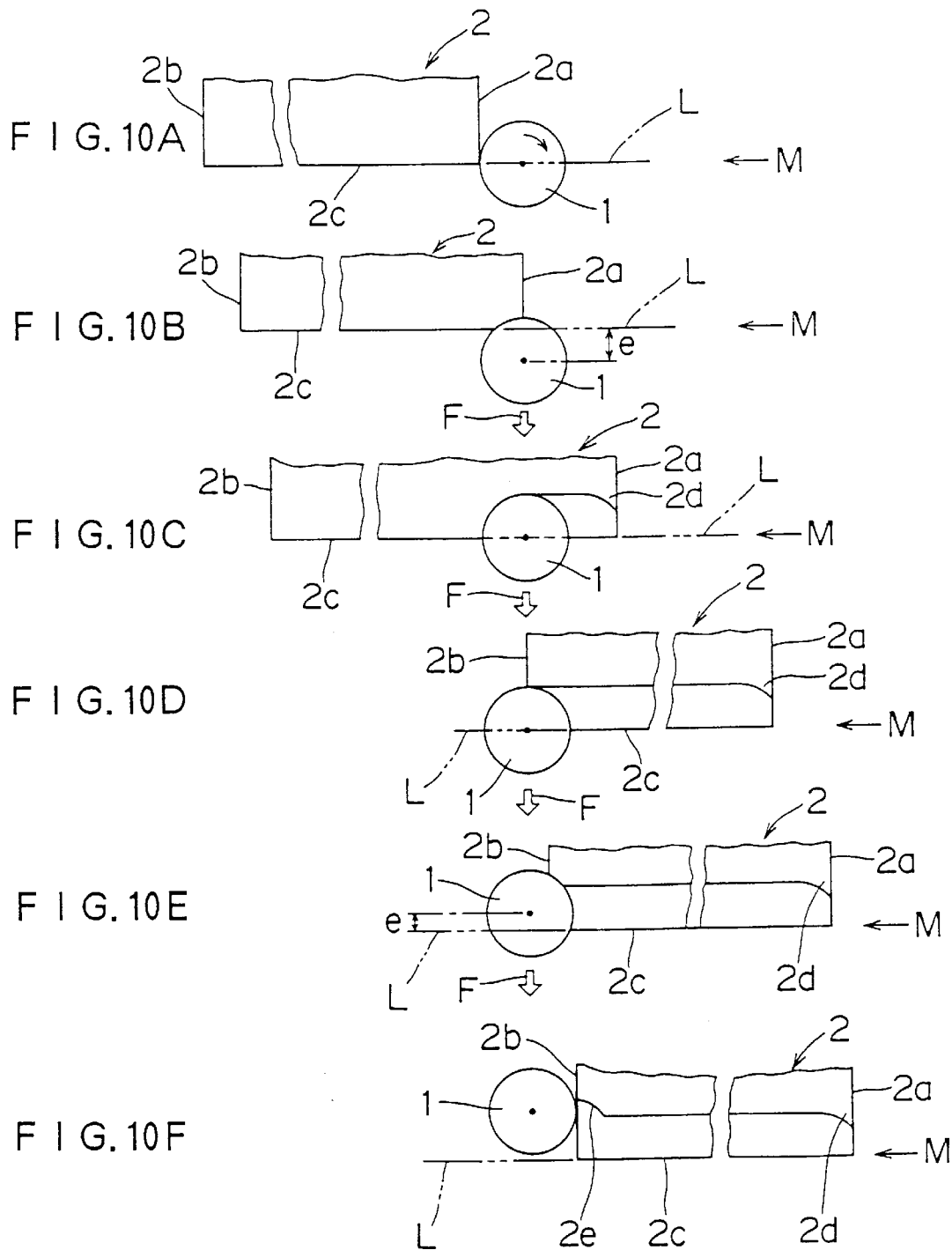
FIGS. 10A to 10F are schematic views of a work and a cutting tool, which sequentially show the manner of working using a conventional machine tool.
Figure 11:
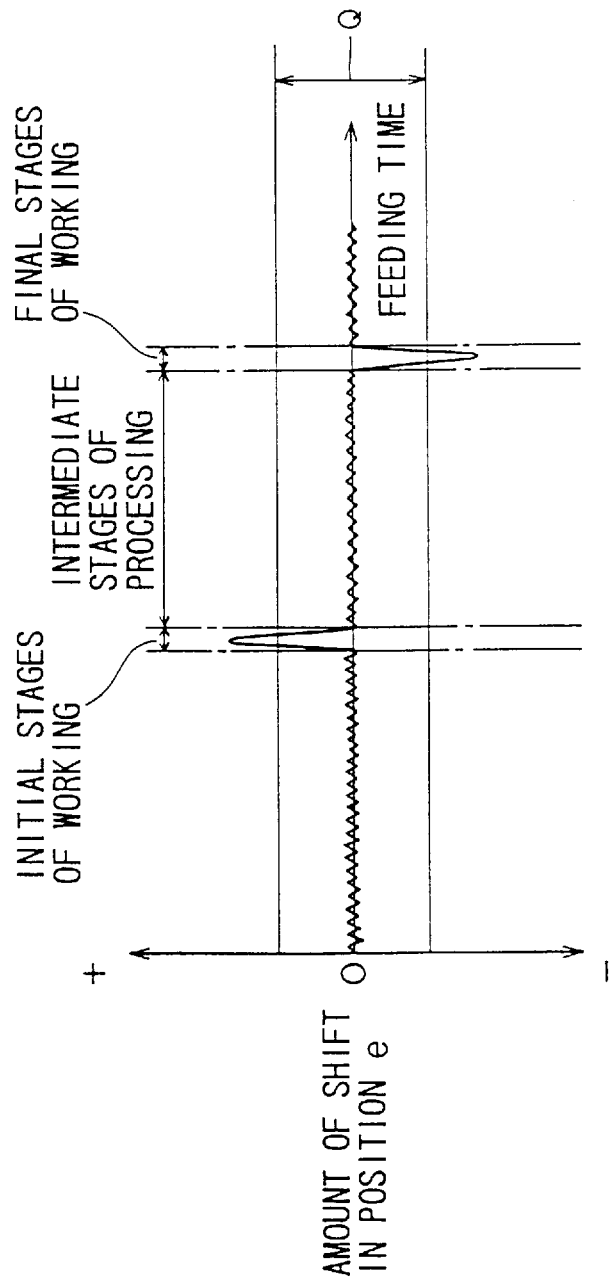
FIG. 11 is a diagram showing the change with time of the amount of the shift in the position from the target position of a rotating shaft in the working using the conventional machine tool.

According to the present embodiment, in a time domain where the cutting tool 10 cuts into the one end surface 20a of the work 20 to start cutting, and a time domain where the cutting tool 10 cuts through the other end surface 20b of the work 20 to terminate cutting, the feed speed V is reduced. Consequently, the rate of change in the external force F received by the cutting tool 10 in the above-mentioned time domain can be reduced. As a result, a magnetic force corresponding to the change of the shift in the position of the cutting tool 10 can be produced without significant delay. Consequently, in the initial stages and the final stages of working, the amount of the shift in the position of the cutting tool 10 can fall within the allowable range Q, as shown in FIG. 9. Therefore, it is possible to feed the cutting tool 10 along the working line L (see FIG. 5), as well as to prevent insufficient cutting in the initial stage of working and excessive cutting in the final stages of working. In FIG. 9, the amount of cutting into the work is increased on the positive side of the amount of the shift in the position.

Furthermore, the feed speed $V_{MAX}$ in the intermediate stages of working which correspond to the remaining time domain may be made sufficiently high as shown in FIG. 7, whereby the working speed can be kept high as a whole.

The present invention is not limited to the abovementioned embodiment. Although in the above-mentioned embodiment, description was made of a structure in which the work 20 is fed toward the cutting tool 10, for example, the present invention is also applicable to a machine tool having a structure in which the spindle unit 33 is fed toward the work 20. In addition thereto, the present invention is also applicable to a machine tool for moving the spindle unit 33 relatively to the work 20 to subject the work 20 to working by not less than two axes attitude control of either one of the spindle unit 33 and the work 20.

When the home position where the cutting tool 10 is stopped is in a feeding position near the work 20, the working of the work 20 is started before the stationary feed speed $V_2$ in a case where no working is performed is not attained. In this case, therefore, the present invention need not be applied to the start of cutting, and is only applied to the termination of cutting.

Furthermore, when the cutting tool 10 does not cut through the end surface of the work 20 to start working at the halfway position of the work 20, the present invention is applied to only the termination of cutting. As this example, there is a case where a spiral-shaped groove is formed from the center of a disc-shaped work, and cuts through a peripheral edge of the disc to terminate the working.

Additionally, when the cutting tool 10 does not cut through the end surface of the work 20, to terminate the working at the halfway position of the work 20, the present invention is applied to only the start of cutting.

It goes without saying that various design changes and modifications can be made in the range of the present invention.

Although the present invention has been described and illustrated in detail, it is clearly understood that the same is by way of illustration and example only and is not to be taken by way of limitation, the spirit and scope of the present invention being limited only by the terms of the appended claims.

The disclosure of Japanese Patent Application Serial No. 7-2877, filed on Aug. 1, 1995, is incorporated herein by reference.

What is claimed is:

1. A machine tool comprising:
   a cylindrical main body;
   a spindle passed through said main body for transmitting torque to a cutting tool;
   an electromagnet for radially supporting said spindle with a clearance therebetween by its magnetic force;
   position detecting means for detecting the position in the radial direction of said spindle;
   a spindle unit comprising means for controlling the magnetic force of said electromagnet so as to maintain said spindle at its target position based upon a signal from said position detecting means;
   feeding means comprising a servo motor for moving said spindle unit relatively to a work and feeding the cutting tool to the work in a predetermined direction of feeding;
   feeding controlling means for controlling the speed of rotation of said servo motor based upon feed speed data stored in a memory,
   said feed speed data comprising a first feed speed corresponding to a time when the cutting tool cuts through an end surface of the work crossing said direction of feeding and a second feed speed corresponding to a time of normal working and higher than said first feed speed.

2. The machine tool according to claim 1, wherein said first feed speed corresponds to a section having a predetermined length including the time when the cutting tool cuts through the end surface of the work crossing said direction of feeding.

3. The machine tool according to claim 1, wherein said first feed speed is so set that an amount of a shift in the position from the target position of the spindle can fall within a predetermined range.

4. The machine tool according to claim 1, wherein said feeding controlling means comprises numerical control device.

5. The machine tool according to claim 1, wherein said cutting tool comprises an end mill.

* * * * *